United States Patent
Blasiak et al.

[11] Patent Number: 6,108,538
[45] Date of Patent: Aug. 22, 2000

[54] METHOD AND APPARATUS FOR DYNAMICALLY CONTROLLING HAND-OFF THRESHOLDS IN A SATELLITE CELLULAR COMMUNICATION SYSTEM

[75] Inventors: Dariusz Andrzej Blasiak, Chicago, Ill.; Mark Steven Frank, Beaverton, Oreg.; Paul Robert Christian, Crystal Lake; Bradley B. Bakke, Lake In The Hills, both of Ill.

[73] Assignee: Motorola, Inc., Schaumburg, Ill.

[21] Appl. No.: 08/980,665

[22] Filed: Dec. 1, 1997

[51] Int. Cl.[7] .............................. H04Q 7/20; H04B 7/185
[52] U.S. Cl. .................... 455/428; 455/12.1; 370/316
[58] Field of Search .................... 455/12.1, 13.1, 455/13.2, 421, 427, 428, 436, 437, 438, 439, 440, 441, 443, 446; 370/316, 329, 331

[56] References Cited

U.S. PATENT DOCUMENTS

| | | | |
|---|---|---|---|
| 5,161,248 | 11/1992 | Bertiger et al. | 455/17 |
| 5,241,685 | 8/1993 | Bodin et al. | 455/33.2 |
| 5,257,402 | 10/1993 | Crisler | 455/33.2 |
| 5,276,906 | 1/1994 | Felix | 455/33.2 |
| 5,408,237 | 4/1995 | Patterson et al. | 342/354 |
| 5,574,968 | 11/1996 | Olds et al. | 455/12.1 |
| 5,649,291 | 7/1997 | Tayloe | 370/332 |
| 5,784,695 | 7/1998 | Upton et al. | 455/442 |
| 5,884,164 | 3/1999 | Gerard et al. | 455/428 |

*Primary Examiner*—Fan Tsang
*Assistant Examiner*—Sheila Smith
*Attorney, Agent, or Firm*—James E. Klekotka

[57] ABSTRACT

In cellular communication systems, hand-offs are performed to maintain links as subscriber units (110) and beams move relative to each other. The hand-off determination procedure (500) is performed in overlap regions (240, 340). Candidate beams are identified and hand-off types are determined based on the satellite (120) associated with the candidate beam. Thresholds are established and changed to optimize a hand-off request determination procedure (500). Two hand-off types are considered. An inter-satellite hand-off is requested (514) when the current beam and the candidate beam are on different satellites (120). An intra-satellite hand-off is requested (510) when the current beam and the candidate beam are on the same satellite (120). Thresholds are dynamically changed and algorithms are used to minimize the number of inter-satellite hand-offs.

15 Claims, 3 Drawing Sheets

200

METHOD AND APPARATUS FOR DYNAMICALLY CONTROLLING HAND-OFF THRESHOLDS IN A SATELLITE CELLULAR COMMUNICATION SYSTEM

FIELD OF THE INVENTION

This invention relates generally to cellular communication systems and, more particularly, to a method and apparatus for dynamically controlling hand-off thresholds in a satellite cellular communication system.

BACKGROUND OF THE INVENTION

One problem which satellite communications systems address is the handing-off of communications between beams. Relative movement between subscriber units and beams causes the subscriber units and the communication links directed thereto to move between beams. To permit continuous communications in an ongoing call, a system must "hand-off" the communication when the subscriber unit crosses a beam boundary. If a communication is not handed-off to a new beam upon leaving an old beam, the communication will eventually be lost because the strength of signals over which communications take place would diminish to a point where the satellite cannot receive the subscriber unit's transmissions, or vice versa.

A satellite cellular communication system with non-geosynchronous orbiting satellites must address the motion of the satellite's antenna beam coverage areas relative to the subscriber units. The satellite beams sweep over the earth's surface at such a high rate of speed that a given subscriber will move through a number of beams during a particular call. In many cases, a subscriber unit may also be serviced by two or more different satellites during a call.

Typically, a conventional cellular communication system deals with the satellite motion by "handing-off" subscriber units from beam to beam or satellite to satellite when the subscriber unit detects that better service is available in a new antenna beam. Whenever one of these hand-offs occurs, the subscriber unit is assigned a new communication channel in the new beam. Each of these hand-offs requires the exchange of signaling data between the satellite and the subscriber unit. If these signaling messages are not received on time, the call may be dropped when the current beam no longer provides enough signal strength to maintain the link.

A hand-off from one satellite to another (inter-satellite hand-off) usually involves more system resources than a hand-off between beams on the same satellite (intra-satellite hand-off). In addition, synchronization is usually more difficult to achieve during inter-satellite hand-offs, which can lead to dropped calls, packet loss, and audio degradation. Therefore, a hand-off algorithm which minimizes inter-satellite hand-offs is desirable.

Another problem related to the hand-off process is known as the "ping-pong effect". This effect occurs when inter-satellite hand-offs occur closely spaced in time. One reason for the ping-pong effect is shadowing. When a given satellite is heavily shadowed for a short duration, an inter-satellite hand-off is undertaken to another satellite which is not heavily shadowed (faded) yet may be lower in received beam power. When the heavy shadowing (fading) on the original beam subsides, conventional hand-off algorithms will initiate a hand-off back to the original beam. This can occur when a subscriber unit moves behind an obstruction. Such a "ping-pong" effect is undesirable, especially from a system standpoint.

Thus, what is needed are a method and apparatus that provide a hand-off algorithm which minimizes inter-satellite hand-offs. Further, what is needed are a method and apparatus which significantly reduces the ping-pong effect.

DETAILED DESCRIPTION OF THE DRAWINGS

The method and apparatus of the present invention provide a hand-off algorithm which minimizes unnecessary hand-offs and maximizes advantageous hand-offs. Also, the method and apparatus of the present invention provide an algorithm which significantly reduces the ping-pong effect.

In a preferred embodiment, subscriber units continuously monitor the power level for received signals to determine when to initiate a hand-off. The method and apparatus of the present invention reduce the number of unnecessary hand-offs that a subscriber unit performs. A candidate beam list and dynamically changing threshold values for hand-off determination are used by the subscriber units to determine when hand-offs should be initiated.

Figure 1:
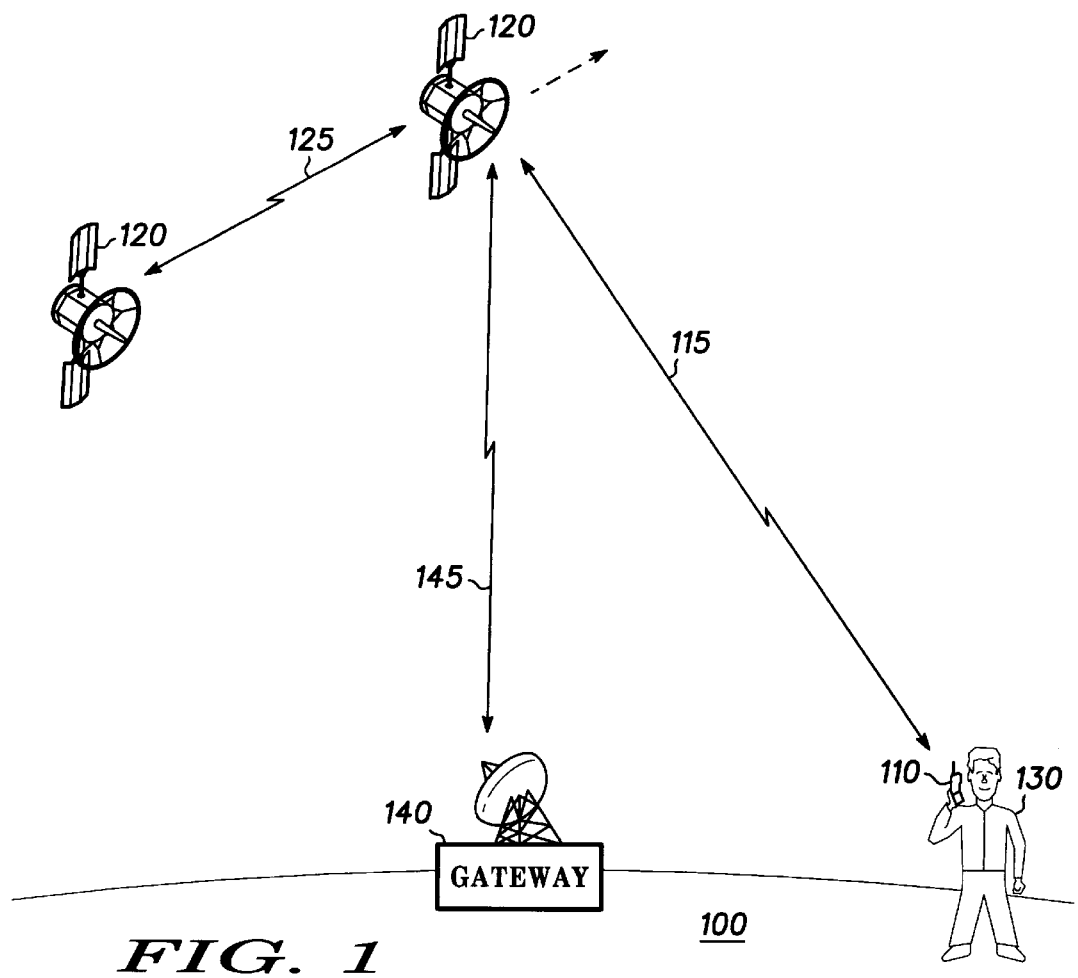
FIG. 1 shows a general view of satellite communication system according to a preferred embodiment of the present invention.

FIG. 1 shows a general view of satellite communication system 100 according to a preferred embodiment of the present invention. Communication system 100 comprises at least one satellite 120, any number of subscriber units 110, and at least one gateway 140. Generally, communication system 100 can be viewed as a network of nodes. All nodes of communication system 100 are or can be in data communication with other nodes of communication system 100 through communication links. In addition, all nodes of communication system 100 are or can be in data communication with other telephonic devices dispersed throughout the world through public switched telephone networks (PSTNS) and/or conventional terrestrial communication devices coupled to communication system 100 through gateways 140.

The present invention is applicable to satellite communication systems that assign particular regions on the earth to specific beams on the earth, and preferably to satellite communication systems that move beams across the surface of the earth. Also, the present invention is applicable to satellite communication systems having at least one satellite in a non-geosynchronous orbit and/or geosynchronous orbit around the earth. There can be a single satellite or many satellites in a constellation of satellites orbiting the earth. The present invention is also applicable to satellite communication systems having satellites which orbit the earth at any angle of inclination including polar, equatorial, inclined or other orbital patterns. The present invention is applicable to systems where full coverage of the earth is not achieved.

The present invention is applicable to systems where plural coverage of portions of the earth occur (that is, more than one satellite is in view of a particular point on the earth's surface).

Each satellite 120 communicates with other adjacent satellites 120 through cross-links 125. These cross-links form a backbone in satellite communication system 100. Thus, a call or communication from one system user 130 or subscriber unit 110 located at any point on or near the surface of the earth can be routed through a satellite or a constellation of satellites to within range of substantially any other point on the surface of the earth. A communication can be routed down to another system user or subscriber unit (which is receiving the call) on or near the surface of the earth from another satellite 120. Alternately, a communication may be routed down to or up from any of many gateways 140, of which FIG. 1 shows only one, through earth link 145.

Subscriber units 110 and/or system users 130 can be located anywhere on the surface of the earth or in the atmosphere above the earth. Communication system 100 can accommodate any number of subscriber units 110. Subscriber units 110 are preferably communication devices capable of transmitting and/or receiving voice and/or data from satellites 120 and/or gateway 140. By way of example, subscriber units 110 can be hand-held, mobile satellite cellular telephones adapted to transmit to and receive transmissions from satellites 120 and/or gateway 140. Moreover, subscriber units 110 can be computers capable of sending email messages, video transmitters or facsimile machines just to name a few. In a preferred embodiment, SUs 110 have been adapted to use a number of dynamically changing thresholds in a hand-off determination procedure (described below). In a preferred embodiment, higher thresholds are used to lower the probability of a hand-off being requested.

System 100 can accommodate a large number of SUs 110. In the preferred embodiments of the present invention, SUs 110 communicate with nearby satellites 120 through subscriber links 115. Links 115 encompass a limited portion of the electromagnetic spectrum that is divided into numerous channels. Links 115 are preferably combinations of L-Band, K-Band and/or S-band frequency channels and may encompass Frequency Division Multiple Access (FDMA) and/or Time Division Multiple Access (TDMA) and/or Code Division Multiple Access (CDMA) communications or combination thereof. Preferably, each satellite 120 supports many traffic channels, and therefore, each satellite 120 can simultaneously service many independent calls. How subscriber units 110 physically transmit voice and/or data to and receive voice and/or data from satellites 120 is well known to those of ordinary skill in the art.

There can be multiple gateways 140 located at different regions on the earth. Gateway 140 communicates with and may control satellite 120. For example, gateway 140 may provide satellite control commands to satellite 120 so that satellite 120 maintains its proper position in its orbit and performs other essential house-keeping tasks. Gateways 140 may be additionally responsible for receiving voice and/or data from satellite 120.

In the preferred embodiment of the present invention, gateway 140 communicates with satellite 120 through links 145. Links 145 encompass a limited portion of the electromagnetic spectrum that is divided into numerous channels. The channels are preferably combinations of L-Band, K-Band and/or S-band frequency channels and may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art. How gateways 140 physically communicate with satellites 120 and/or subscriber units 110 is well known to those of ordinary skill in the art. In addition, gateway 140 can provide access to the public switched telephone network (PSTN) or other communications facilities (not shown).

In a preferred embodiment, system 100 is synchronized in time. The system clock settings for satellites 120, gateways 140, and SUs 110 are substantially the same, except for clock errors which might result from drift or hardware inaccuracies and malfunctions. The time to which system 100 is synchronized is referred to herein as the "system time". Although only one system time is used herein for exemplary purposes, multiple synchronized system times may be employed by communication system 100.

Figure 2:
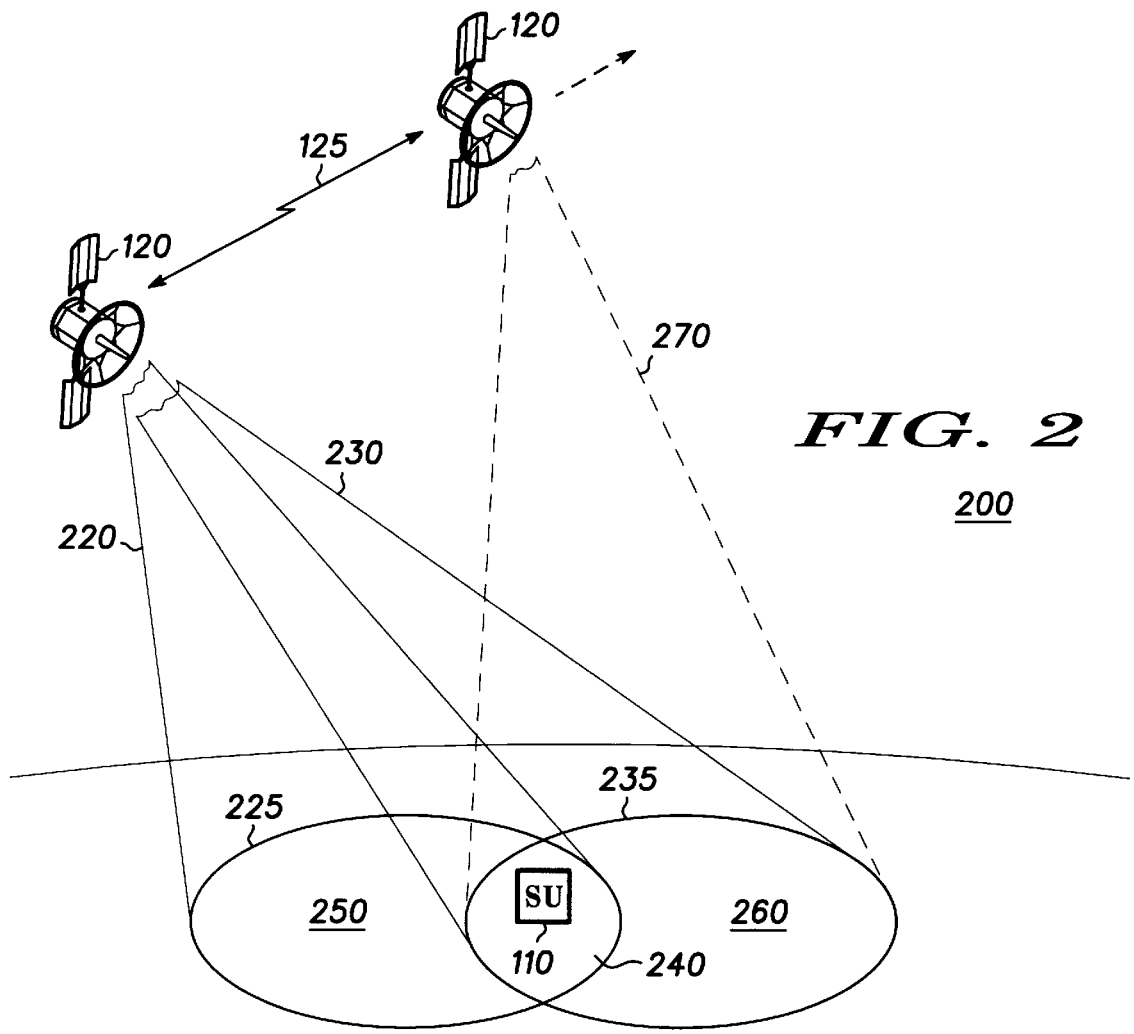
FIG. 2 illustrates a simplified diagram of a number of overlapping beams formed on the surface of the earth by at least one satellite in accordance with a preferred embodiment of the present invention.

FIG. 2 illustrates a simplified diagram of a number of overlapping beams formed on the surface of the earth by at least one satellite in accordance with a preferred embodiment of the present invention. Beam footprint 225 is formed by beam 220. Beam footprint 235 is formed either by beam 230 or by beam 270. FIG. 2 illustrates beam 220 and beam 230 originating on the same satellite 120, and beam 270 originates on a different satellite 120.

In a preferred embodiment, each satellite 120 includes an array antenna which provides numerous discrete antenna beams 220, 230, and 270. These beams are projected at numerous diverse angles away from satellite 120. The array projects a well-defined pattern of beam footprints on the earth's surface, and the pattern of beam footprints includes regions where beam footprints overlap. FIG. 2 illustrates an exemplary pattern of two overlapping beam footprints 225, 235. Two overlapping beam footprints are shown to simplify the understanding of the present invention. Overlap region 240 can include more than two beam footprints.

Overlap region 240 is also shown in FIG. 2, and overlap region 240 can be the result of antenna beams 220 and 230 which are produced by an antenna array on a single satellite 120. Overlap region can also be the result of antenna beams 220 and 270 which are produced by antenna arrays on different satellites. Subscriber unit 110 desirably resides within overlap region 240 during hand-off determination procedures.

Single coverage regions 250 and 260 are regions within beam footprints 225 and 235, respectively, in which only one beam can be seen by a potential user. SU 110 desirably transitions from a single coverage region to an overlap region. SU 110 can also transition from one overlap region to another overlap region. In addition, SU 110 can transition from an overlap region to a single coverage region. For example, SU 110 could transition from single coverage region 250 to overlap region 240 and then to single coverage region 260. SU 110 transitions from one region to another due to the relative movement between SU 110 and satellites 120.

On each satellite 120, there are a number of beams pointing to earth. In a preferred embodiment, each beam establishes a beam footprint. The number of beams (cells) is unimportant to the present invention and could be a small amount or a large number of beams. In a preferred embodiment, beam footprints 225 and 235 are moving in a predictable manner; meaning that, they move across the surface of the earth in relation to the movement of a satellite. In an alternate embodiment, satellite 120 could produce beam footprints 225, 235 which are "earth-fixed".

In a preferred embodiment, at each point of the satellite's orbit about the earth, the location of each of the beams (cells) can be determined. The location and size of the beams remain relatively constant. The location of each beam (and thus the center of each beam footprint) is determinable and known by at least one system control center. In addition, the size of each beam (and thus the size of each beam footprint) is also determinable and known by at least one system control center. In an alternate embodiment, beam footprint information (size and location) is used to determine overlap regions and to anticipate hand-offs.

Relative movement between subscriber units and beam footprints causes the subscriber units and their associated communication links to move between beams. For example, to permit continuous communications in an ongoing call, a system must "hand-off" an in-process call when the subscriber unit is located within an overlap region (crosses a beam boundary). If a call is not handed-off to a new beam upon leaving an old beam, the call would eventually be lost because the strength of the signals over which communications take place would diminish to a point where the satellite cannot receive the subscriber unit's transmissions, or vice versa.

Hand-off determination is performed in overlap region 240. Hand-offs are completed before a subscriber unit transitions out of the current beam so that it is able to continue to receive or initiate communications. In a hand-off determination process, a subscriber unit and communication system work together. The hand-off determination process requires an SU to be capable of sustaining at least two simultaneous channels.

Subscriber links 115 (FIG. 1) can include one or more broadcast channels. SUs can synchronize to at least one broadcast channel and monitor the broadcast channel to determine signal levels and obtain data messages which are addressed to them. SUs can transmit messages to communication satellites over one or more acquisition channels. Broadcast channels and acquisition channels are not dedicated to any one user but are shared by all users currently within view of satellite 120.

Conventional cellular communications systems address the hand-off problem by monitoring and comparing signal strengths for at least two channels in adjacent cells. A currently used channel associated with one cell can be monitored and compared by a subscriber unit to a candidate channel in another cell.

Figure 3:
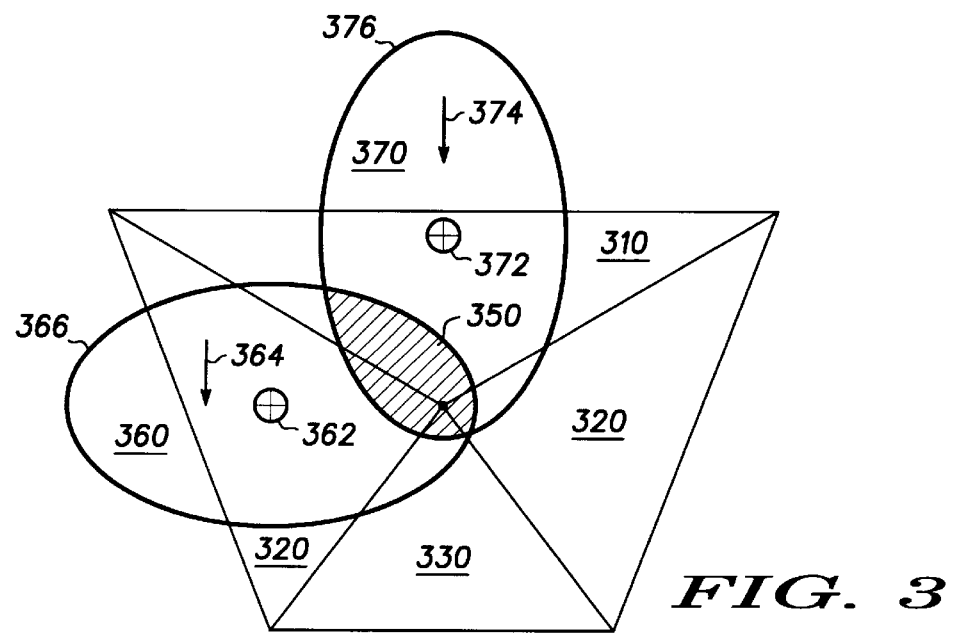
FIG. 3 illustrates a subscriber unit and its associated hand-off determination areas along with two overlapping beams in accordance with a preferred embodiment of the present invention.

FIG. 3 illustrates a subscriber unit and its associated hand-off determination areas along with two overlapping beams in accordance with a preferred embodiment of the present invention. FIG. 3 illustrates a subscriber unit located at position 350. FIG. 3 also shows a number of hand-off determination areas (310, 320 and 330). FIG. 3 illustrates front area 310, side area 320, and back area 330. The number of areas shown is for illustrative purposes and is not intended to limit the scope of the invention. The shapes used are also for illustrative purposes and are not intended to limit the scope of the present invention.

Areas are established around a subscriber unit's position 350 based on the desirability of a hand-off taking place in that region. The most desirable region is an area in front of the subscriber unit. Front area 310 defines an area in which the beams are moving towards the subscriber unit, and these beams are most desirable from a usability point of view. Beams located in front area 310 are likely to provide service for the longest length of time. A hand-off threshold is established for front area 310 which gives this type of hand-off a high probability of occurrence.

Beams located to the side of the subscriber unit's current position 350 are less desirable than those located to the front. Side area 320 defines an area which is less desirable from a usability point of view. Beam footprints located in side area 320 have a lower probability of providing service for a substantial amount of time. A hand-off threshold is established for side area 320 which gives this type of hand-off a lower probability of occurrence.

Beams located to the back of the subscriber unit's current position 350 are less desirable than those located in other areas. Back area 330 defines an area which is least desirable from a usability point of view. Beam footprints located in back area 330 have the lowest probability of providing service for a substantial amount of time. A hand-off threshold is established for back area 330 which gives this type of hand-off the lowest probability of occurrence.

In addition, FIG. 3 shows current beam 360, a current beam's positioning point 362, the current beam's velocity vector 364, and the current beam's boundary 366. Also, FIG. 3 shows candidate beam 370, the candidate beam's positioning point 372, the candidate beam's velocity vector 374, and the candidate beam's boundary 376. In a preferred embodiment, subscriber unit 110 locates itself within one of the beams and in doing so establishes a current beam.

FIG. 2 and FIG. 3 show example beams with example beam boundary. A beam boundary identifies the set of points where the hand-off determination procedure can be started. In alternate embodiments, these boundaries are calculated by a system control center based on some of the system's operational parameters, such as satellite position, transmitting power, and antenna pointing directions. These beam boundaries can identify regions having the same signal level, and/or the same link margin.

Beam sizes can change based on decisions made by the system. For example, transmit power can be changed, and this can alter the size and shape of one or more beams. Beams can be made narrower or wider, and this causes changes in the associated beam footprints. For example, beam width can be dependent on the time of day. Thresholds can also be changed to account for the changes in the beam characteristics.

Beam characteristics can be satellite dependent. For example, some satellites can have transmitter and antenna characteristics which have changed due to time. In addition, beam characteristics can be dependent on the orbit for the satellites and can vary based on the satellite's position within the orbit.

Figure 4:
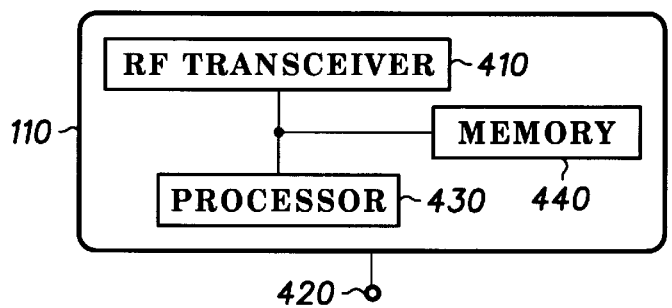
FIG. 4 illustrates a simplified block diagram of a subscriber unit for use in a preferred embodiment of the present invention.

FIG. 4 illustrates a simplified block diagram of a subscriber unit for use in a preferred embodiment of the present invention. SU 110 (FIG. 1) comprises RF transceiver 410, antenna 420, processor 430, and memory 440. RF transceiver 410 is used to transmit RF signals to and receive RF signals from at least one satellite. Transceiver 410 is coupled to processor 430 and to at least one antenna 420. Antenna 420 is used to establish at least one communication channel with at least one satellite.

When a signal is received from a satellite by RF transceiver 410, RF transceiver 410 and processor 430 can measure the signal level for candidate beams and make signal level comparisons for hand-off determination purposes. In a preferred embodiment, when a candidate beam's power level exceeds a certain level relative to the current beam's power level, then a subscriber unit can make a hand-off decision, but a single hand-off decision may not always be enough to initiate a hand-off request.

In an alternate embodiment, a position determining receiver (not shown) is also coupled to processor 430. In this case, a global positioning system (GPS) may be used to provide location information, among other things, to processor 430.

In a preferred embodiment of the present invention, processor 430 continuously monitors signal levels received from transceiver 410. Signal level monitoring for a set of beams is performed until a hand-off determination procedure is completed. For example, signal monitoring can include non-coherent power level measurements. Processor 430 determines which threshold value to use and when to change threshold values to, among other things, minimize unnecessary hand-offs and maximize advantageous hand-offs. In addition, processor 430 desirably carries out procedures exemplified below and described in the associated text. For example, along with performing other tasks as appropriate, processor 430 desirably stores results from such procedures in memory 440.

Processor 430 generally controls and manages user interfaces, message reception and transmission, channel set-up, radio tuning, frequency and time slot assignment, and other subscriber unit communication and control functions. Processor 430, among other things, reads and processes threshold values stored in memory 440. Processor 430 uses dynamically variable threshold values to determine which beam to use for a hand-off request. Processor 430 may include at least one timer which it controls and monitors.

Memory 440 stores data that serve as instructions to processor 430 and that, when executed by processor 430, cause SU 110 to carry out procedures which are discussed below. In addition, memory 440 includes threshold values, variables, tables, and databases that are manipulated during the operation of SU 110.

Figure 5:
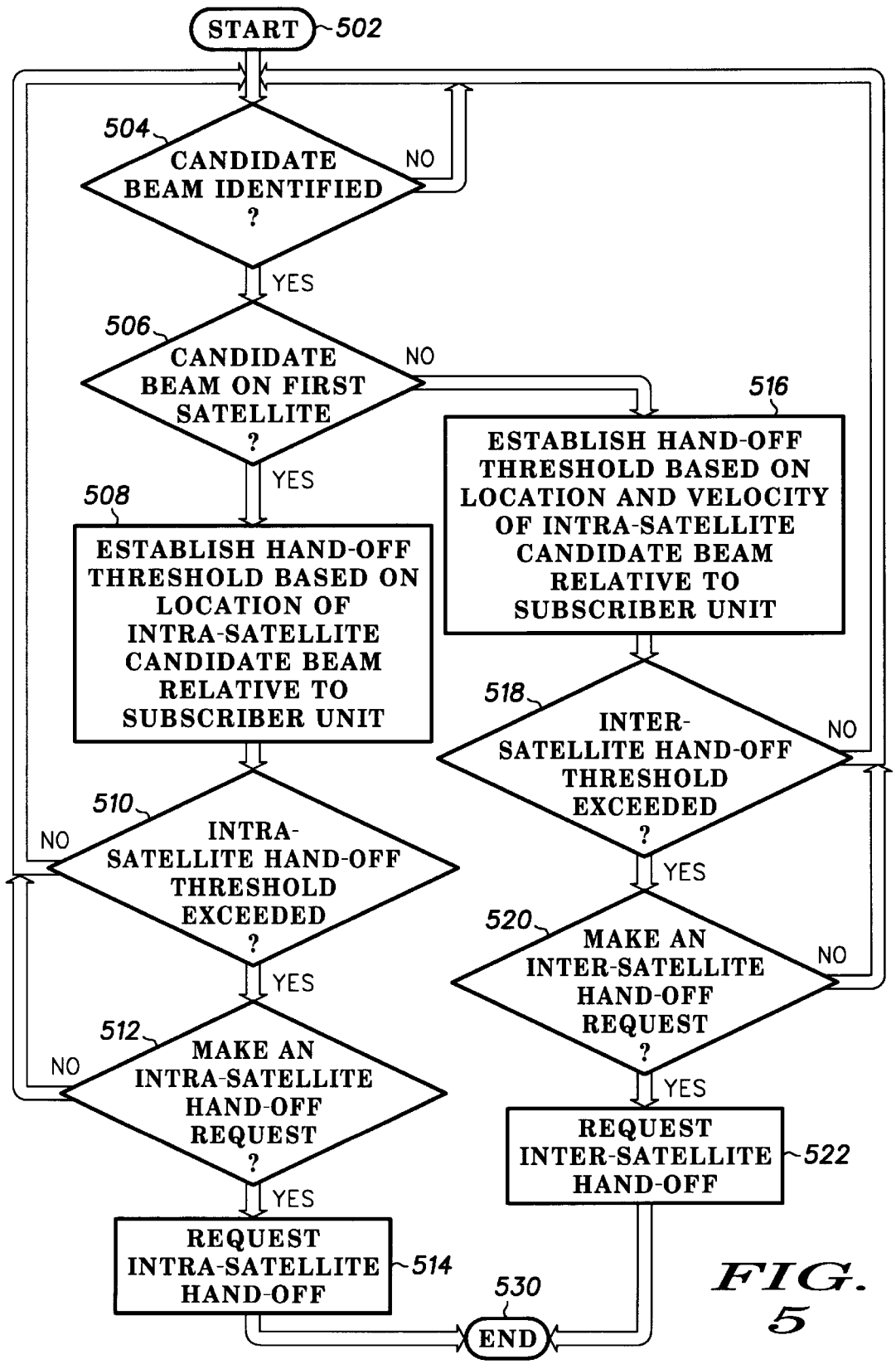
FIG. 5 illustrates a flowchart of a method for operating a subscriber unit in accordance with a preferred embodiment of the present invention.

FIG. 5 illustrates a flowchart of a method of operating a subscriber unit in accordance with a preferred embodiment of the present invention. Procedure 500 can be initiated upon power up of the subscriber unit, and it is performed at periodic intervals. Step 502 can be the result of a communication system request.

In step 504, a query is performed to determine if a candidate beam has been identified for use in the comparison procedure. The subscriber unit's processor determines when a candidate beam has been identified for use in the steps shown below. For example, the candidate beam being used can be identified using a number. When the subscriber unit's processor determines that a candidate beam is available, then procedure 500 continues to step 506. When the subscriber unit's processor has not identified a candidate beam, procedure 500 remains in step 504.

In a preferred embodiment, a subscriber unit can receive signals from beams which are on a current candidate beam list and from beams which are not on the current candidate beam list. Those beams which are on the current candidate beam list are identified as candidate beams. The current candidate beam list is constantly updated by the system.

In a preferred embodiment, a subscriber unit can transition into an overlap region in which more than one candidate beam can be received. Desirably, overlap regions occur when only two beam footprints partially coincide, however, overlap regions do occur when more than two beam footprints partially coincide.

When more than one candidate beam is available, SU determines which candidate beam to use during this part of the procedure. In a preferred embodiment, the SU chooses the first one which is on the current candidate list.

In a preferred embodiment, SU continuously attempts to receive signals and/or make power measurements from potential candidate beams without any prior knowledge about beam location. A candidate list of beams is determined by the system.

In one alternate embodiment, SU determines when to begin trying to identify candidate beams based on the SU's current position. Location can be determined by a number of methods. In a preferred embodiment, the SU's location is determined by the SU independent of the communication system. For example, the SU determines its location using a satellite positioning system such as the Global Positioning System (GPS). In another alternate embodiment, the SU can be dependent on the communication system for determining its location.

In some cases, one or more candidate beams are on a particular satellite, and at least one other candidate beam is on one or more different satellites.

In step 506, a query is performed by the subscriber unit's processor to determine if the candidate beam is on the same satellite as the current beam. A hand-off from one satellite to another satellite (inter-satellite hand-off) usually involve more system resources than a hand-off between beams on the same satellite (intra-satellite hand-off).

In alternate embodiments, a subscriber unit stores a number of candidate beam lists for each satellite and selects one based on the SU's present location and present time. In some of these cases, the candidate beam lists are predictions of the expected beams for particular satellites at particular points in time. In some cases, a subscriber unit can process a number of candidate beam lists during a hand-off determination procedure. In other cases, different candidate beam lists can result from a single satellite or can result from two or more satellites being within the viewing window of the subscriber unit.

In another embodiment, candidate beam lists include threshold values. These candidate beam lists can include current and past threshold values.

When the subscriber unit's processor determines that the candidate beam is on the same satellite as the current beam, procedure 500 continues to step 508. When the subscriber unit's processor determines that the candidate beam is not on the same satellite as the current beam, procedure 500 branches to step 514.

In step 508, the subscriber unit establishes hand-off thresholds based on the location of the intra-satellite candidate beam relative to the subscriber unit. The subscriber unit uses hand-off determination regions and dynamic threshold values to optimize the hand-off determination procedure. Areas are established around a subscriber unit based on the desirability of a hand-off taking place in that region. The most desirable region is the area in front of the subscriber unit. In a satellite communication system, beams and their associated beam footprints move relatively fast with respect to the subscriber unit. Since beams are constantly moving, it is more desirable to hand-off to a beam which has the greatest chance for providing service for the longest time.

A hand-off threshold is established for the front area which gives this type of hand-off a high probability of occurrence. Threshold values change dynamically as conditions change. For example, threshold values can be changed to accommodate changes in beam loading as well as changes in beam location relative to the subscriber unit's location. In some cases, the signal level for the candidate beam is larger than the signal level for the current beam. In other cases, the absolute value of the difference between the signal level for the candidate beam and the current beam must be less than a certain value. This allows the candidate beam to have a smaller signal level than the current beam.

In a preferred embodiment, a first difference value is determined by subtracting the current beam's signal level from the candidate beam's signal level. Desirably, this first difference value is a positive number when a hand-off request is made. This means that the signal level for the candidate beam is stronger than the signal level for the current beam.

When the hand-off decision is based on a first difference value, then a front area threshold is established which makes this first difference value as small as possible. The decision to hand-off is made based on a small first difference value because this hand-off type is the most desirable.

Intra-satellite candidate beams and their associated beam footprints which are located to the side of the subscriber unit's current position are less desirable than those located to the front. Beam footprints to the side have a lower probability of providing service for a substantial amount of time.

A hand-off threshold is established for the side area which gives this type of hand-off a lower probability of occurrence. When the hand-off decision is based on the first difference value, then a side area threshold is established which requires a larger first difference value than that used for the front area. When the hand-off decision is based on a first difference value, then this side area threshold is made larger than the front area threshold but still as small as possible. This means there is more of difference between the two signal levels, when the decision to make this type of hand-off is made. The decision to hand-off is made based on a larger first difference value because this hand-off type is less desirable than a hand-off made in the front area.

Intra-satellite candidate beams and their associated beam footprints which are located to the back of the subscriber unit are the least desirable beams to use for hand-offs. Beam footprints to the back have the lowest probability of providing service for the greatest amount of time. Beam footprints located to the back are generally associated with beams which have moved past the subscriber unit's current position and cannot provide the maximum amount of service time.

A hand-off threshold is established for the back area which gives this type of hand-off a lowest probability of occurrence. When the hand-off decision is based on the first difference value, then a back area threshold is established which requires a larger first difference value than that used for the side area. When the hand-off decision is based on a first difference value, then this back area threshold is made larger than the side area threshold but still as small as possible. This means there is even more of difference between the two signal levels, when the decision to make this type of hand-off is made. The decision to hand-off is made based on a larger first difference value because this hand-off type is less desirable than a hand-off made in the side area or in the front area.

In step 510, a query is performed by the subscriber unit's processor to determine if an intra-satellite hand-off threshold has been exceeded. In other words, the subscriber unit's processor determines if a particular intra-satellite candidate beam is a better beam than the current beam. In a preferred embodiment, a signal dependent hand-off determination algorithm is used. This means that the signal quality of the current beam is evaluated with respect to the signal quality of the candidate beam. A hand-off decision is made when the signal quality of a particular intra-satellite candidate beam exceeds the signal quality of the current beam by the previously determined hand-off threshold.

Each intra-satellite candidate beam has a hand-off threshold associated with it. For example, if the beam is assigned to the front area, then it has a front area threshold associated with it. A first difference value is calculated for this type of beam (front) and this first difference value is compared to a front area threshold. When the first difference value exceeds the front area threshold, then a hand-off decision is made. In an alternate embodiment, this type of hand-off decision is known as a first level decision and is given a high weight because it was associated with the front area.

If, for example, the beam is assigned to the side area, then it has a side area threshold associated with it. A first difference value is calculated for this type of beam (side) and this first difference value is compared to a side area threshold. When this first difference value exceeds the side area threshold, then a hand-off decision is made. In an alternate embodiment, this type of hand-off decision is known as a second level decision and is given a lower weight because it was associated with the side area.

Additionally, if the beam is assigned to the back area, then it has a back area threshold associated with it. A first difference value is calculated for this type of beam (back) and this first difference value is compared to a back area threshold. When this first difference value exceeds the back area threshold, then a hand-off decision is made. In an alternate embodiment, this type of hand-off decision is known as a third level decision and is given an even lower weight because it was associated with the back area.

When signal quality being used for comparison represents some aspect of signal power, then the intra-satellite hand-off threshold has the same units of measure. Intra-satellite hand-off thresholds are dynamic. Intra-satellite hand-off thresholds desirably are changed by the subscriber unit and/or the system based one or more variables. For example, variables can include time of day, beam loading factors, location, and a user's level of service. In addition, an intra-satellite hand-off threshold can be changed to overcome anticipated fading.

When the subscriber unit's processor determines that a hand-off threshold has been exceeded, then procedure 500 continues to step 512. When the subscriber unit's processor determines that the hand-off threshold has not been exceeded, procedure 500 branches back to step 504 and iterates as shown in FIG. 5.

In step 512, a query is performed by the subscriber unit's processor to determine if a hand-off request should be made. This decision is based on how many times a threshold has been exceeded and the type of threshold which was exceeded. In other words, the subscriber unit's processor determines if a "best" candidate beam is a better beam than the current beam.

In a preferred embodiment, hand-off decisions are not always based on the results of single comparison. Signal levels are measured a number of times and first difference values are calculated a number of times. If a beam is assigned to the front area, then a single hand-off decision of this type is sufficient to cause a hand-off to be requested. If a beam is assigned to the side area, then a number of hand-off decisions of this type must occur before a hand-off will be requested.

In a preferred embodiment, a number of comparisons are performed to increase the level of confidence associated with the decision. Time delays can also be used between comparisons to increase the level of confidence. In other cases, threshold values are changed between queries to overcome a problem such as fading.

In a preferred embodiment, intra-satellite hand-off decisions are not always based on the results of single comparison. Signal levels are measured a number of times and first difference values are calculated a number of times. If a beam is assigned to the front area, then a single hand-off decision of this type is sufficient to cause an inter-satellite hand-off to be requested. If a beam is assigned to another area, then a number of hand-off decisions of this type must occur before a hand-off will be requested.

In alternate embodiments, the subscriber unit also determines a confidence level for the decision. When the confidence level is high, then another query is not performed. When the confidence level is low, the subscriber unit can perform another calculation at a future time. In this case, the future time should be a time before the subscriber unit is expected to transition out of the overlap region.

When the subscriber unit's processor determines that a hand-off request should be made, then procedure 500 continues to step 514. When the subscriber unit's processor determines that the hand-off request should not be made, procedure 500 branches back to step 504 and iterates as shown in FIG. 5.

In step 514, the subscriber unit's processor requests an intra-satellite hand-off. Procedure 500 continues from step 514 to step 530 and ends.

In step 516, the subscriber establishes inter-satellite (satellite-to-satellite or SV—SV) hand-off thresholds based on the location of the inter-satellite candidate beam relative to the subscriber unit, and modifies these thresholds based on the velocity of the second satellite relative to the first satellite. In some constellations of satellites, satellites have different orbital characteristics, and this causes relative velocities to exist between satellites. The subscriber unit uses the hand-off determination regions and the velocity of the second satellite relative to the first satellite to optimize the hand-off process.

Each inter-satellite candidate beam has a hand-off threshold associated with it. Thresholds associated with intra-satellite candidate beams are different from thresholds associated with inter-satellite candidate beams. These differences are established to increase the probability of intra-satellite hand-offs. Desirably, the inter-satellite (SV—SV) hand-off thresholds are more difficult to exceed than the intra-satellite hand-off thresholds. This tends to minimize inter-satellite hand-offs. In addition, threshold levels and the differences between them are set to minimize the ping-pong effect.

As stated previously, areas are established around a subscriber unit based on the desirability of a hand-off taking place in that region. The most desirable region is to the front of the subscriber unit. If neighboring satellites are moving in the same direction as the current satellite, then the beams associated with these satellites will not have large relative velocities.

In a satellite communication system, beams on neighboring satellites and their associated beam footprints also move relatively fast with respect to the subscriber unit. Since inter-satellite hand-offs require more system resources, it is more desirable to hand-off to a beam on another satellite which has the greatest chance for providing service for the longest time.

A hand-off threshold is established for the front area which gives this type of hand-off a high probability of occurrence. Threshold values change dynamically as conditions change. Threshold values are changed to accommodate changes in beam loading as well as changes in beam location relative to the subscriber unit's location.

Inter-satellite candidate beams and their associated beam footprints which are located to the side of the subscriber unit's current location are less desirable than those located to the front. Beam footprints to the side have a lower probability of providing service for the greatest amount of time.

Inter-satellite candidate beams and their associated beam footprints which are located to the back of the subscriber unit are the least desirable beam footprints to use for hand-offs. Beam footprints to the back have the lowest probability of providing service for a significant amount of time. Beam footprints located to the back are generally associated with beams which have moved past the subscriber unit's current position and cannot provide a substantial amount of service time.

For example, if the beam is assigned to the front area but is from a different satellite, then it has an SV—SV front area threshold associated with it. A first difference value is calculated for this type of beam (front SV—SV) and this first difference value is compared to an SV—SV front area threshold. When the first difference value exceeds the SV—SV front area threshold, then a hand-off decision is made. In an alternate embodiment, this type of hand-off decision is known as a first level SV—SV decision and is given a high weight because it was associated with the front area.

If, for example, the beam is assigned to the side area but is from a different satellite, then it has an SV—SV side area threshold associated with it. A first difference value is calculated for this type of beam (side SV—SV) and this first difference value is compared to an SV—SV side area threshold. When this first difference value exceeds the SV—SV side area threshold, then a hand-off decision is made. In an alternate embodiment, this type of hand-off decision is known as a second level SV—SV decision and is given a lower weight because it was associated with the side area.

Additionally, if the beam is assigned to the back area but is from a different satellite, then it has an SV—SV back area threshold associated with it. A first difference value is calculated for this type of beam (back SV—SV) and this first difference value is compared to an SV—SV back area threshold. When this first difference value exceeds the SV—SV back area threshold, then a hand-off decision is made. In an alternate embodiment, this type of hand-off decision is known as a third level SV—SV decision and is given an even lower weight because it was associated with the back area and a different satellite.

In some constellations, seams are present where satellites are moving in substantially opposite directions. The relative velocity between satellites can cause relative velocities to exist between beams originating on these satellites.

In a preferred embodiment, seams are present in the constellation. Hand-offs can take place "across the seam". This means that a hand-off can take place between satellites in different orbital planes, and the satellites in these two orbital planes are traveling is opposing directions. When a hand-off of this type occurs, the subscriber unit changes its hand-off determination areas to account for the change in direction of the satellites in the new orbital plane.

In a preferred embodiment, hand-off thresholds are established and modified based on the relative velocity between the two satellites which are being used in a satellite-to-satellite hand-off. For example, a satellite-to-satellite hand-off that takes place across the seam can exhibit voice delay problems. Desirably, a hand-off threshold is established for this type of hand-off which gives this type of hand-off a relatively low probability of occurrence.

For example, when the hand-off decision is based on the first difference value, then a "seam-crossing" threshold is established which requires a larger first difference value than that used for the other areas associated with satellite-to-satellite hand-offs. When the hand-off decision is based on a first difference value, then this "seam-crossing" threshold is made larger than the other satellite-to-satellite thresholds but still as small as possible. This means there is even more of difference between the two signal levels, when the decision to request a "seam-crossing" hand-off is made. The decision to request a "seam-crossing" hand-off is made based on a larger first difference value because a "seam-crossing" hand-off is less desirable than a satellite-to-satellite hand-off made in the other areas, especially in the side area or in the front area.

In step 518, a query is performed by the subscriber unit's processor to determine if an SV—SV hand-off threshold has been exceeded. In other words, the subscriber unit's processor determines if an inter-satellite candidate beam is a better beam than the current beam. In a preferred embodiment, a signal dependent hand-off algorithm is used. This means that the signal quality of the current beam is evaluated with respect to the signal quality of the candidate beam. A hand-off decision is made when the signal quality of a particular candidate beam exceeds the signal quality of the current beam by the previously determined hand-off threshold.

When signal quality being used for comparison represents some aspect of signal power, then the inter-satellite hand-off threshold has the same units of measure. Inter-satellite hand-off thresholds are dynamic. Inter-satellite hand-off thresholds desirably are changed by the subscriber unit based one or more variables. For example, variables can include time of day, cell loading factors, location, and a user's level of service. In addition, an inter-satellite hand-off threshold can be changed to overcome anticipated fading.

When the subscriber unit's processor determines that an SV—SV hand-off threshold has been exceeded, then procedure 500 continues to step 520. When the subscriber unit's processor determines that an SV—SV hand-off threshold has not been exceeded, procedure 500 branches back to step 504 and iterates as shown in FIG. 5.

In step 520, a query is performed by the subscriber unit's processor to determine if an inter-satellite hand-off request should be made. This decision is based on how many times a threshold has been exceeded and the type of threshold which was exceeded. In other words, the subscriber unit's processor determines if the "best" inter-satellite candidate beam is a better beam than the current beam.

In a preferred embodiment, a number of comparisons are performed to increase the level of confidence associated with the decision. Time delays can also be used between queries to increase the level of confidence. In other cases, threshold values are changed between queries to overcome a problem such as fading.

In a preferred embodiment, inter-satellite hand-off decisions are not always based on the results of single comparison. Signal levels are measured a number of times and first difference values are calculated a number of times. If a beam is assigned to the front area, then a single hand-off decision of this type is sufficient to cause an inter-satellite hand-off to be requested. If a beam is assigned to the side area, then a number of hand-off decisions of this type must occur before a hand-off will be requested.

In alternate embodiments, the subscriber unit also determines a confidence level for the decision. When the confidence level is high, then another comparison is not performed. When the confidence level is low, the subscriber unit can perform another comparison at a future time. In this case, the future time should be a time before the subscriber unit is expected to transition out of the overlap region.

When the subscriber unit's processor determines that an inter-satellite hand-off request should be made, then procedure 500 continues to step 522. When the subscriber unit's processor determines that an inter-satellite hand-off request should not be made at this time, procedure 500 branches back to step 504 and iterates as shown in FIG. 5.

In step 522, the subscriber unit's processor requests an inter-satellite hand-off. Procedure 500 continues from step 522 to step 530 and ends.

When procedure 500 ends, the subscriber unit performs a hand-off. The type of hand-off is based on the results obtained from procedure 500.

In alternate embodiments, intra-satellite thresholds and inter-satellite thresholds can change based on the current latitude for the subscriber unit. Desirably, lower thresholds are used at higher latitudes. In addition, when polar orbits are considered more beam overlap occurs at the higher latitudes, and some beams can be turned-off. In some constellations, beams are turned-off at higher latitudes to prevent interference problems.

In a preferred embodiment, the subscriber units in the communication system report their status to a system control center. Subscriber units can receive updated candidate lists and threshold values at various times from a control center. A control center can calculate new candidate lists and threshold values based on system level decisions. In alternate embodiments, satellites can store candidate lists and threshold values and updated versions of candidate lists. In addition, threshold values can be sent to the subscriber units when these satellites establish links with the subscriber units.

In summary, the method and apparatus of the present invention enable subscriber units to more efficiently determine when hand-offs should be requested and what type of hand-offs should be requested. Candidate lists and dynamically changing threshold values allow subscriber units to more accurately predict when a inter-satellite hand-off should be requested. This ensures that subscriber units minimize the number of hand-offs they perform. While the principles of the invention have been described above in connection with specific procedure, it is to be clearly understood that this description is made only by way of example and not as a limitation on the scope of the invention.

For example, although the description describes a system using LEO satellites, MEO satellites or satellites in other orbits could also or alternatively be used. Any combination of satellites in different orbits could be used for the cellular system. These and other changes and modifications which are obvious to those skilled in the art are intended to be included within the scope of the present invention.

What is claimed is:

1. A method for optimizing hand-offs performed by a subscriber unit, wherein said subscriber unit is located at a first position and communicates with a first satellite using a current beam, said method comprising the steps of:

establishing a front area, a side area, and a back area relative to said first position, wherein said establishing step further comprises the steps of: associating a first level of usability with said front area, associating a second level of usability with said side area, and associating a third level of usability with said back area;

identifying a candidate beam and a position for said candidate beam, wherein said identifying step further comprises the step of associating said candidate beam with said first satellite;

setting a hand-off threshold based on said position for said candidate beam relative to said front area, to said side area, and to said back area;

requesting an intra-satellite hand-off when said hand-off threshold is exceeded and said candidate beam is associated with said first satellite; and requesting an inter-satellite hand-off when said hand-off threshold is exceeded and said candidate beam is associated with a second satellite, wherein said setting step further comprises the steps of:
setting a hand-off threshold to a first value when said candidate beam is positioned within said front area;
setting said hand-off threshold to a second value when said candidate beam is positioned within said side area; and
setting said hand-off threshold to a third value when said candidate beams is positioned with said back area.

2. A method for optimizing hand-offs performed by a subscriber unit, wherein said subscriber unit is located at a first position and communicates with a first satellite using a current beam, said method comprising the steps of:

establishing a front area, a side area, and a back area relative to said first position, wherein said establishing step further comprises the steps of: associating a first level of usability with said front area, associating a second level of usability with said side area, and associating a third level of usability with said back area;

identifying a candidate beam and a position for said candidate beam, wherein said identifying step further comprises the steps of associating said candidate beam with said second satellite, and determining a relative velocity between said first satellite and said second satellite, wherein said relative velocity is positive when said first satellite and said second satellite are moving in relatively parallel directions;

setting a hand-off threshold based on said position for said candidate beam relative to said front area, to said side area, and to said back area;

requesting an intra-satellite hand-off when said hand-off threshold is exceeded and said candidate beam is associated with said first satellite; and requesting an inter-satellite hand-off when said hand-off threshold is exceeded and said candidate beam is associated with a second satellite, wherein said setting step further comprises the step of:
setting a hand-off threshold to a first value when said candidate beam is positioned with said front area and said relative velocity is positive;
setting said hand-off threshold to a second value when said candidate beam is positioned with said side area and said relative velocity is positive;
setting said hand-off threshold to a third value when said candidate beam is positioned with said back area and said relative velocity is positive; and
setting said hand-off threshold to a fourth value when said relative velocity is negative.

3. The method as claimed in claim 1, wherein said identifying step further comprises the steps of:
associating a first level with a first signal received by said subscriber unit in said current beam;
associating a second level with a second signal received by said subscriber unit in a second beam; and
identifying said second beam as said candidate beam when a difference between said first level and said second level exceeds a first amount.

4. The method as claimed in claim 1, wherein said identifying step further comprises the steps of:
associating a first level with a first signal received by said subscriber unit in said current beam;
associating a second level with a second signal received by said subscriber unit in a second beam; and
identifying said second beam as said candidate beam when a difference between said first level and said second level does not exceed a first amount.

5. The method as claimed in claim 1, wherein said identifying step further comprises the steps of:
associating a second level with a second signal received by said subscriber unit in a second beam; and
identifying said second beam as said candidate beam when said second level exceeds a candidate beam threshold.

6. The method as claimed in claim 1, wherein said requesting an intra-satellite hand-off step further comprises the steps of:
associating a first level with a first signal received by said subscriber unit in said current beam;
associating a second level with a second signal received by said subscriber unit in a second beam; and
requesting said intra-satellite hand-off when a difference between said first level and said second level exceeds said hand-off threshold.

7. The method as claimed in claim 1, wherein said requesting an intra-satellite hand-off step further comprises the steps of:
associating a first signal quality with a first signal received by said subscriber unit in said current beam;
associating a second signal quality with a second signal received by said subscriber unit in a second beam; and
requesting said intra-satellite hand-off when a difference between said first signal quality and said second signal quality exceeds said hand-off threshold.

8. The method as claimed in claim 1, wherein said requesting an inter-satellite hand-off step further comprises the steps of:
associating a first level with a first signal received by said subscriber unit in said current beam;
associating a second level with a second signal received by said subscriber unit in a second beam; and
requesting said inter-satellite hand-off when a difference between said first level and said second level exceeds said hand-off threshold.

9. The method as claimed in claim 1, wherein said requesting an inter-satellite hand-off step further comprises the steps of:
associating a first signal quality with a first signal received by said subscriber unit in said current beam;
associating a second signal quality with a second signal received by said subscriber unit in a second beam; and
requesting said inter-satellite hand-off when a difference between said first signal quality and said second signal quality exceeds said hand-off threshold.

10. The method as claimed in claim 1, wherein said method further comprises the steps of:

determining a velocity for said current beam; and setting a hand-off threshold based on said velocity.

11. The method as claimed in claim 1, wherein said method further comprises the steps of:

determining a velocity for said candidate beam; and setting a hand-off threshold based on said velocity.

12. A method for optimizing hand-offs performed by a subscriber unit, wherein said subscriber unit is located at a first position and communicates with a first satellite using a current beam, said method comprising the steps of:

establishing a front area, a side area, and a back area relative to said first position, wherein said establishing step further comprises the steps of: associating a first level of usability with said front area, associating a second level of usability with said side area, and associating a third level of usability with said back area;

identifying a candidate beam and a position for said candidate beam;

setting a hand-off threshold based on said position for said candidate beam relative to said front area, to said side area, and to said back area;

requesting an intra-satellite hand-off when said hand-off threshold is exceeded and said candidate beam is associated with said first satellite;

requesting an inter-satellite hand-off when said hand-off threshold is exceeded and said candidate beam is associated with a second satellite;

determining a relative velocity for said candidate beam with respect to said current beam; and setting a hand-off threshold based on said relative velocity.

13. The method as claimed in claim 1, wherein said establishing step further comprises the steps of:

defining said front area, said side area, and said back area using at least one straight line.

14. The method as claimed in claim 1, wherein said establishing step further comprises the steps of:

defining said front area, said side area, and said back area using at least one curved line.

15. A subscriber unit for self-determining a hand-off initiation time, said subscriber unit comprising:

an antenna for transmitting signals to and receiving other signals from at least one satellite using radio frequency (RF) channels within at least two beams;

an RF transceiver coupled to said antenna for processing said signals and said other signals;

a processor coupled to said RF transceiver, said processor for determining signal levels, for determining signal qualities, for determining thresholds, for comparing, and for requesting hand-offs; and a memory coupled to said processor for storing data that serve as instructions and include candidate lists, variables, tables, and databases that are manipulated during operation of said subscriber unit, wherein said subscriber unit further comprises means for establishing a front area, a side area, and a back area relative to a first position, means for associating a first level of usability with said front area, associating a second level of usability with said side area, and associating a third level of usability with said back area, means for identifying a candidate beam and a position for said candidate beam, means for setting a hand-off threshold based on said position for said candidate beam relative to said front area, to said side area, and to said back area, means for requesting an intra-satellite hand-off when said hand-off threshold is exceeded and said candidate beam is associated with a first satellite, and means for requesting an inter-satellite hand-off when said hand-off threshold is exceeded and said candidate beam is associated with a second satellite.

* * * * *